United States Patent
Kling et al.

(10) Patent No.: US 9,353,685 B2
(45) Date of Patent: May 31, 2016

(54) TURBINE ENGINE NOSECONE WITH DEFORMATION REGION

(71) Applicant: United Technologies Corporation, Hartford, CT (US)

(72) Inventors: Colin J. Kling, Middletown, CT (US); James J. McPhail, New London, CT (US); Matthew R. Rader, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 758 days.

(21) Appl. No.: 13/725,359

(22) Filed: Dec. 21, 2012

(65) Prior Publication Data

US 2014/0255202 A1    Sep. 11, 2014

(51) Int. Cl.
*B64C 11/14* (2006.01)
*F02C 7/05* (2006.01)

(52) U.S. Cl.
CPC .. *F02C 7/05* (2013.01); *B64C 11/14* (2013.01)

(58) Field of Classification Search
CPC ............... F02C 7/00; F02C 7/04; F02C 7/05; F02C 7/047; B64C 11/02
USPC .......................................... 244/134 R, 134 A
See application file for complete search history.

(56) References Cited

U.S. PATENT DOCUMENTS

| | | | |
|---|---|---|---|
| 4,744,214 A | 5/1988 | Monsarrat et al. | |
| 5,252,165 A | 10/1993 | Fecto et al. | |
| 5,573,378 A | 11/1996 | Barcza | |
| 5,833,435 A | 11/1998 | Smith | |
| 6,358,014 B1 * | 3/2002 | Chou et al. | 416/245 R |
| 7,739,865 B2 | 6/2010 | Prasad et al. | |
| 7,938,368 B2 | 5/2011 | Hogate | |
| 7,955,046 B2 | 6/2011 | McCune et al. | |
| 8,286,654 B2 | 10/2012 | Prasad et al. | |
| 2009/0081039 A1 * | 3/2009 | McCune et al. | 415/214.1 |
| 2011/0047959 A1 | 3/2011 | DiBenedetto | |

FOREIGN PATENT DOCUMENTS

GB         2011542 A  *  7/1979

* cited by examiner

*Primary Examiner* — Edward Look
*Assistant Examiner* — Maxime Adjagbe
(74) *Attorney, Agent, or Firm* — O'Shea Getz P.C.

(57) ABSTRACT

An assembly for a turbine engine including a nosecone that extends along an axis between a tip end and a second end. The nosecone includes a base region and a deformation region configured integral with the base region. The base region is arranged axially between the deformation region and the second end. The deformation region is adapted to deform relative to the base region upon impact of an object, and includes a stress concentrator.

20 Claims, 7 Drawing Sheets

TURBINE ENGINE NOSECONE WITH DEFORMATION REGION

BACKGROUND OF THE INVENTION

1. Technical Field

This disclosure relates generally to a turbine engine and, more particularly, to a turbine engine nosecone.

2. Background Information

A typical turbine engine includes a nosecone for directing air into a gas path of the engine. The nosecone may be connected to a hub of a compressor or fan rotor. Such a nosecone is often referred to as a spinner. Alternatively, the nosecone may be connected to a hub of a static support assembly.

The nosecone may include a plurality of discrete segments such as a nosecone segment and a frangible cap segment. The nosecone segment has a generally tapered tubular geometry. The cap segment has a generally dish-shaped geometry. The cap segment is adapted to fracture into a plurality of pieces upon collision with a foreign object such as a relatively large bird while remaining intact through other events such as hail ingestion. These pieces typically enter and subsequently pass through the gas path before exiting the engine. A downstream end of the nosecone segment is fastened to the hub. The cap segment is fastened to an upstream end of the nosecone segment. Flanges and fasteners utilized to connect the cap segment to the nosecone segment may increase nosecone manufacturing costs as well as the overall weight of the nosecone.

There is a need in the art for an improved turbine engine nosecone.

SUMMARY OF THE DISCLOSURE

According to an aspect of the invention, an assembly is provided for a turbine engine. The assembly includes a nosecone that extends along an axis between a tip end and a second end. The nosecone includes a base region and a deformation region configured integral with the base region. The base region is arranged axially between the deformation region and the second end. The deformation region is adapted to deform relative to the base region upon impact of an object, and includes a stress concentrator.

According to another aspect of the invention, another assembly is provided for a turbine engine. The assembly includes a nosecone that extends along an axis between a tip end and a second end. The nosecone includes a sidewall, a base region and a deformation region. The base region is arranged axially between the deformation region and the second end, and includes a first portion of the sidewall that has a first thickness. The deformation region includes a stress concentrator and a second portion of the sidewall that has a second thickness, which is less than the first thickness. The stress concentrator is configured as or includes a transition between the first portion and the second portion.

According to another aspect of the invention, another assembly is provided for a turbine engine. The assembly includes a nosecone that extends along an axis between a tip end and a second end. The nosecone includes a sidewall, a base region and a deformation region configured integral with the base region. The base region is arranged axially between the deformation region and the second end. The deformation region includes a plurality of stress concentrators. A first of the stress concentrators includes a groove that extends axially within the sidewall and/or circumferentially within the sidewall at least partially around the axis.

According to another aspect of the invention, still another assembly is provided for a turbine engine. The assembly includes a nosecone that extends along an axis between a tip end and a second end. The nosecone includes a base region and a deformation region configured integral with the base region. The base region is arranged axially between the deformation region and the second end. The deformation region may deform relative to the base region upon impact of an object via at least one stress concentrator.

The deformation region may be adapted to deform by crumpling and/or fracturing upon impact of the object.

The nosecone may include a sidewall. At least a first portion of the sidewall may have a first thickness. At least a second portion of the sidewall may have a second thickness that is less than the first thickness. The stress concentrator may be configured as or include a transition between the first portion and the second portion. The first portion may be located within the base region. The second portion may be located within the deformation region. Alternatively, both the first and the second portions may be located within the deformation region.

The transition may taper from the first portion to the second portion. Alternatively, the transition may be configured as or include a step between the first portion and the second portion.

The nosecone may include a sidewall. The concentrator may be configured as or include a flange that extends radially inwards from the sidewall and is arranged adjacent the base region.

The nosecone may include a sidewall. The stress concentrator may be configured as or include a groove that extends circumferentially within the sidewall at least partially around the axis.

The nosecone may include a sidewall. The stress concentrator may be configured as or include a groove that extends axially within the sidewall.

The stress concentrator may be one of a plurality of stress concentrators included in the deformation region. Some or all of these stress concentrators may have a similar configuration or alternatively different configurations. For example, at least some of the stress concentrators may be arranged in a radial array. At least some of the stress concentrator may also or alternatively each extend circumferentially within a sidewall of the nosecone at least partially around the axis.

The nosecone may include a sidewall and a mounting flange. The mounting flange may be connected to the sidewall and located at the second end.

The assembly may include an annular nosecone mount fastened to the nosecone at the second end.

The nosecone may include a nosecone segment and a cap segment fastened to the nosecone segment. The cap segment may include the base region and the deformation region.

The nosecone may have a parti-ellipsoidal geometry. Alternatively, the nosecone may have a conical geometry, or any other type of dish-shaped geometry.

The assembly may include a plurality of engine rotors arranged along the axis. The engine rotors may include a first rotor and a second rotor. Each of the engine rotors may include a plurality of rotor blades arranged around and connected to a rotor disk. The first rotor may be driven by the second rotor. The nosecone may be connected to the first rotor. The assembly may also include a gear train that connects a plurality of the engine rotors together; e.g., the first rotor to the second rotor. The first rotor may be a fan rotor.

The assembly may include a stator. The nosecone may be connected to the stator.

The foregoing features and elements may be combined in various combinations without exclusivity, unless expressly indicated otherwise. These features and elements as well as the operation of the invention will become more apparent in light of the following description and the accompanying drawings.

DETAILED DESCRIPTION OF THE INVENTION

Figure 1:
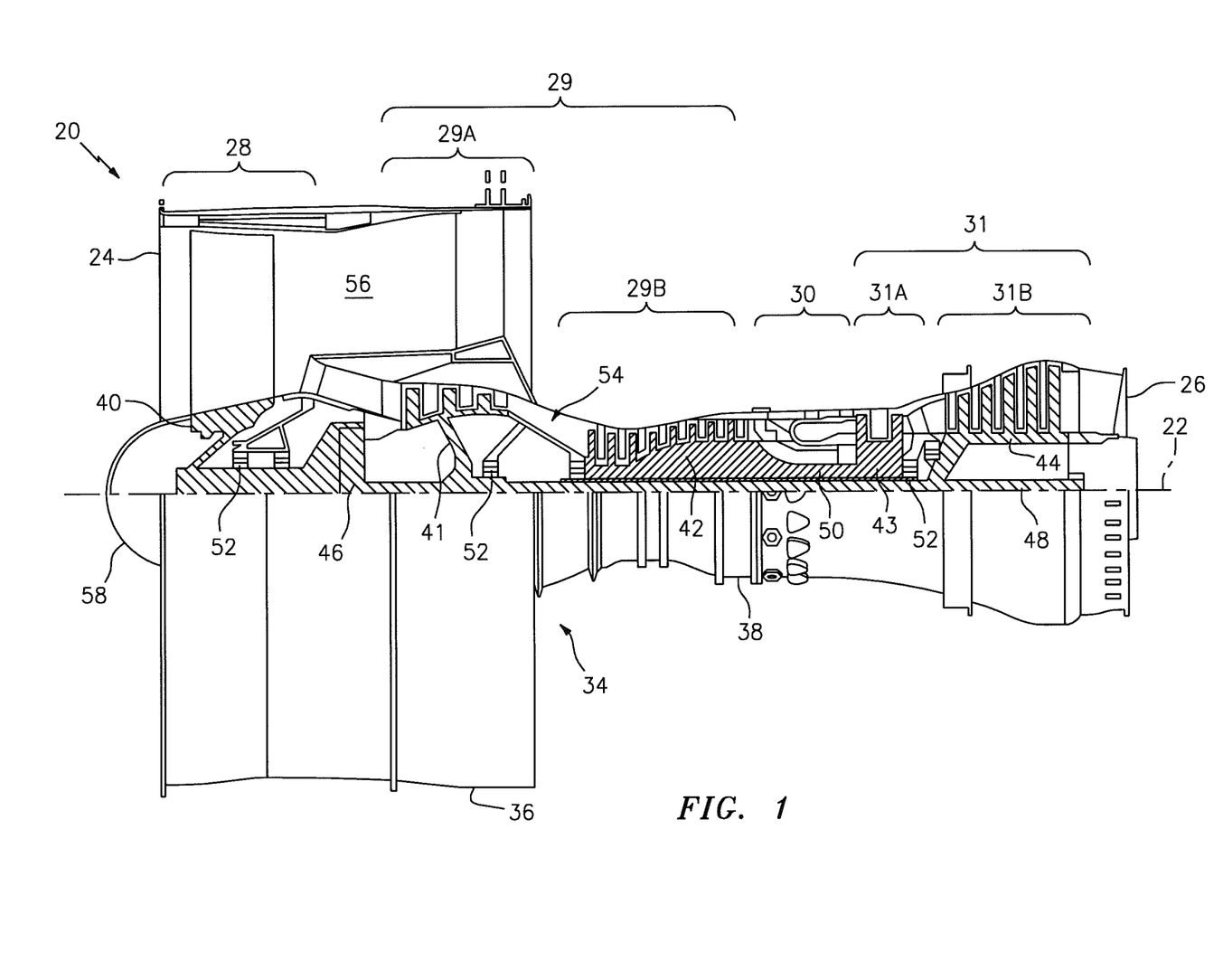
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed or otherwise adhered to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust or reverse thrust via a thrust reverser. The bypass air may also be utilized to cool various turbine engine components within one or more of the engine sections 29-31.

Figure 2:
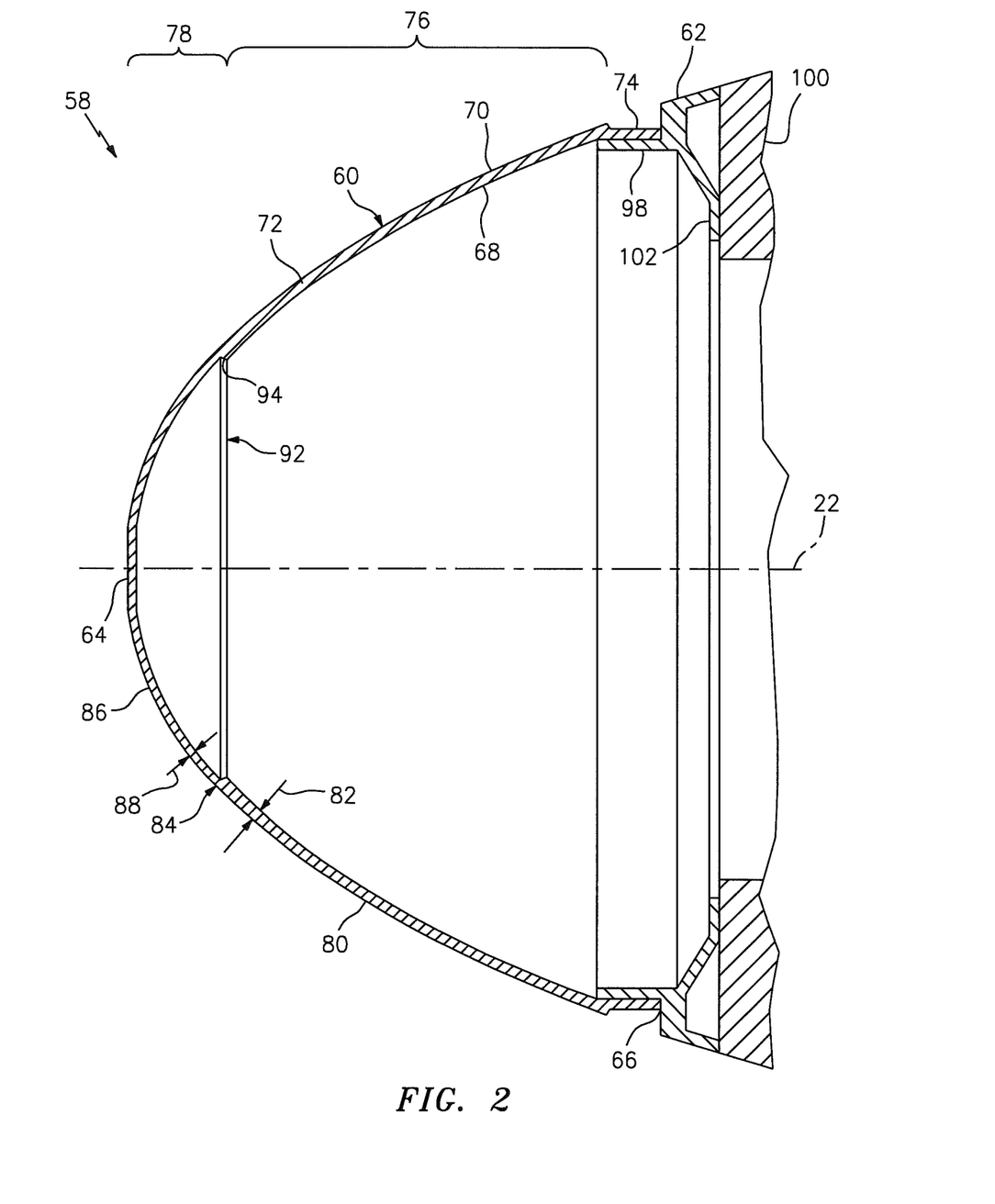
FIG. 2 is a side sectional illustration of a nosecone assembly connected to a turbine engine component.

FIG. 2 illustrates a nosecone assembly 58 that includes a nosecone 60 and a nosecone mount 62 (e.g., a Y-flange annular nosecone mount). The nosecone 60 may be configured as a unitary body. Alternatively, the nosecone may be configured with a plurality of discrete segments as discussed below in further detail. The nosecone 60 may be cast, milled, forged, molded, laminated, additively manufactured and/or otherwise formed from metal (e.g., aluminum, stainless steel, titanium, nickel, etc.) or a composite that includes, for example, reinforcement fibers (e.g., Kevlar® fibers, fiberglass, carbon fiber, etc.) disposed within a polymer matrix (e.g., a resin matrix). The present invention, however, is not limited to any particular nosecone materials or formation techniques.

The nosecone 60 extends circumferentially around the axis 22. The nosecone 60 extends along the axis 22 between an upstream tip end 64 and a downstream end 66. The nosecone 60 extends radially and/or axially between a nosecone interior surface 68 and a nosecone exterior surface 70. The nosecone 60 includes a sidewall 72 and a mounting flange 74 (e.g., an annular flange). The sidewall 72 includes a base region 76 and a deformation region 78 (e.g., a crumple and/or frangible zone) that is integral with the base region 76.

The base region 76 is arranged axially between the deformation region 78 and the downstream end 66. The base region 76, for example, includes an annular first portion 80 of the sidewall 72 that extends axially from the deformation region 78 to the mounting flange 74. The first portion 80 has a first thickness 82 that extends between the interior surface 68 and the exterior surface 70. The first thickness 82 may be measured at (e.g., proximate, adjacent or on) an intersection 84 between the base region 76 and the deformation region 78.

Figure 6:
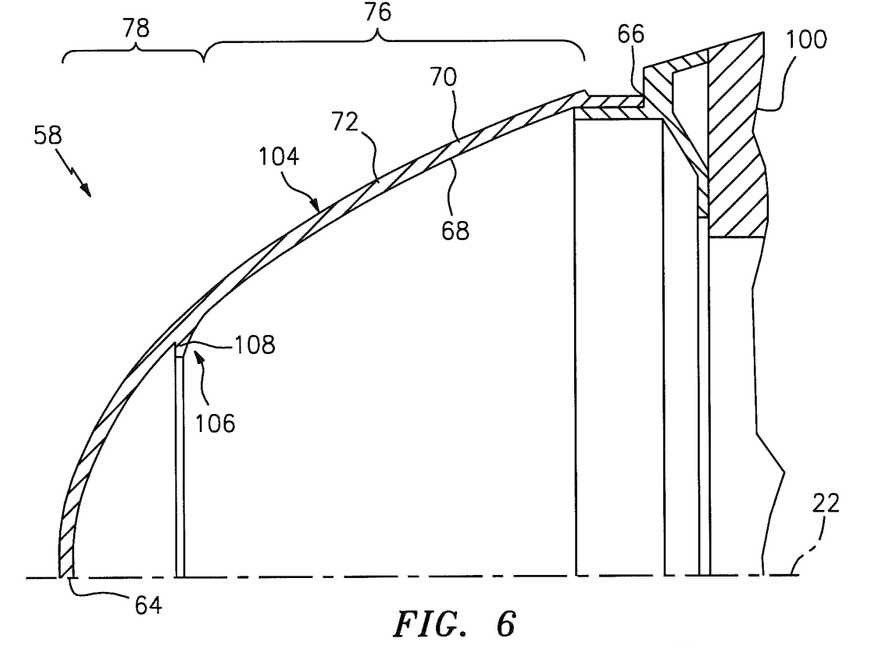
FIG. 6 is a partial side sectional illustration of another nosecone assembly connected to a turbine engine component.
Figure 8:
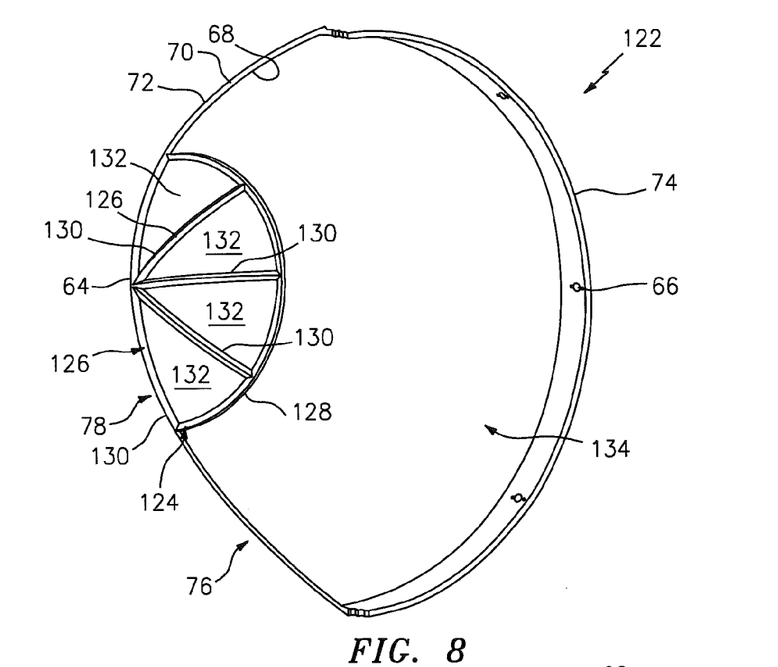
FIG. 8 is a perspective cutaway illustration of a nosecone.
Figure 9:
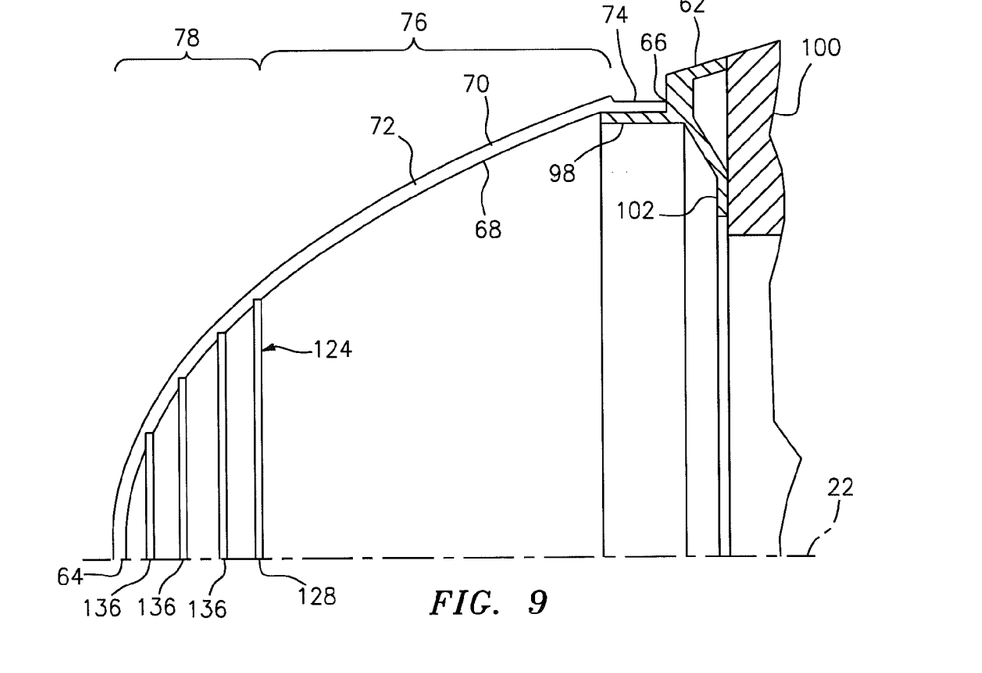
FIG. 9 is a partial side sectional illustration of another nosecone assembly connected to a turbine engine component.

The deformation region 78 is arranged axially between the base region 76 and the tip end 64. The deformation region 78, for example, includes a dish-shaped second portion 86 of the sidewall 72 that extends axially from the base region 76 to the tip end 64. The second portion 86 has a second thickness 88 that extends between the interior surface 68 and the exterior surface 70. The second thickness 88 may be measured at the intersection 84 between the base region 76 and the deformation region 78. This second thickness 88 is less than the first thickness 82. Alternatively, the second thickness may be substantially equal to (or greater than) the first thickness as illustrated in FIGS. 6, 8 and 9, which are discussed below in further detail.

Figure 3:
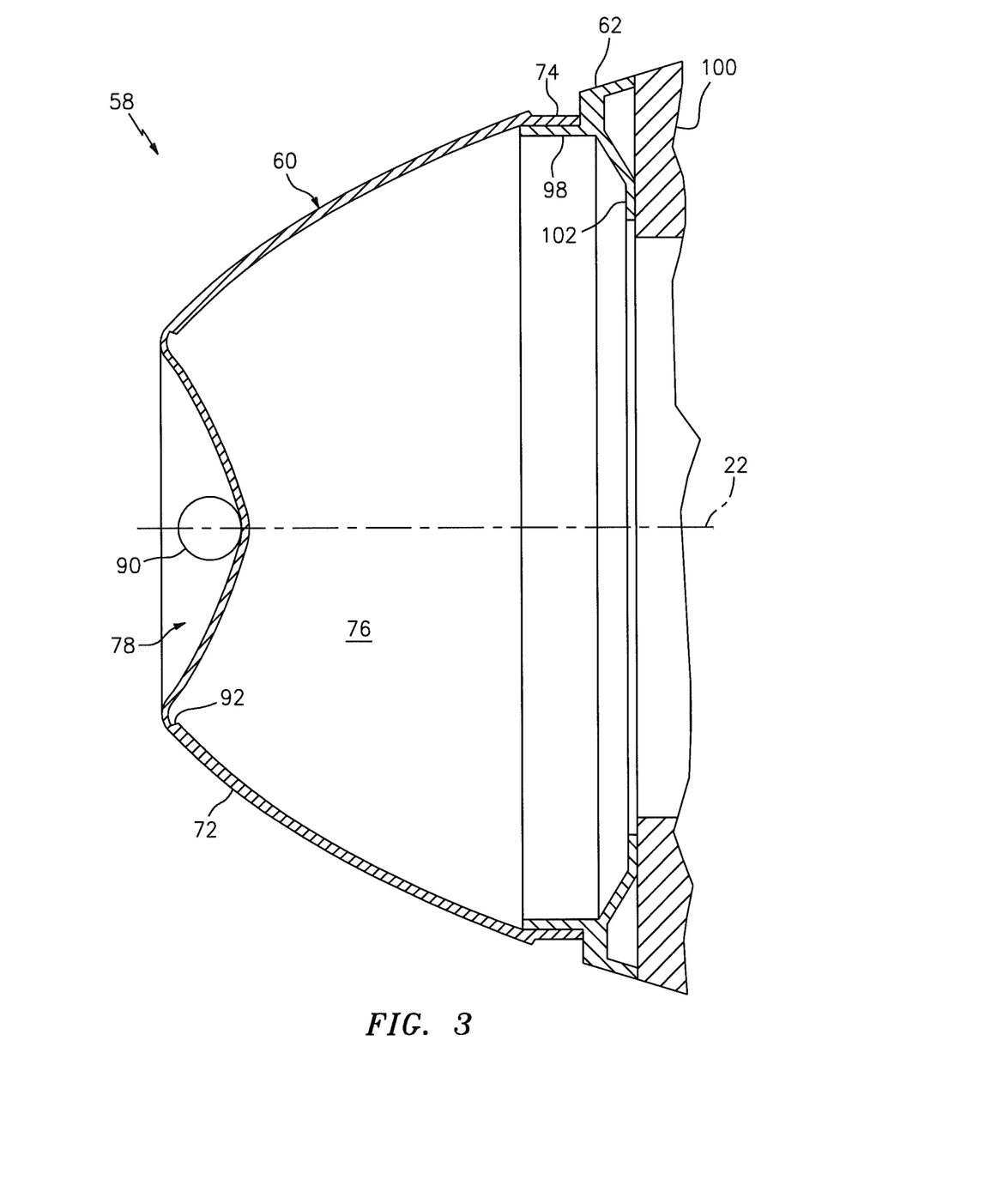
FIG. 3 is a side sectional illustration of the nosecone assembly of FIG. 2 during an impact event.

Referring to FIG. 3, the deformation region 78 is adapted to crumple, fracture and/or otherwise deform upon being impacted by an object 90 that strikes the deformation region 78 with an axial and/or radial force greater than, for example, 40 kN (kiloNewtons) or 9,000 pounds-force. Examples of such an object 90 may include a medium or large size bird, or any other object having a weight greater than, for example, 2 pounds. Alternatively, the deformation region may be adapted to deform upon being subjected to a force less than 40 kN or 9,000 pounds-force. By contrast, the base region 76 may be adapted to substantially maintain its shape during the foregoing impact event. The base region 76 may also or alternatively be adapted to substantially maintain its shape upon being axially and/or radially impacted by an object 90 as described above.

Figure 4:
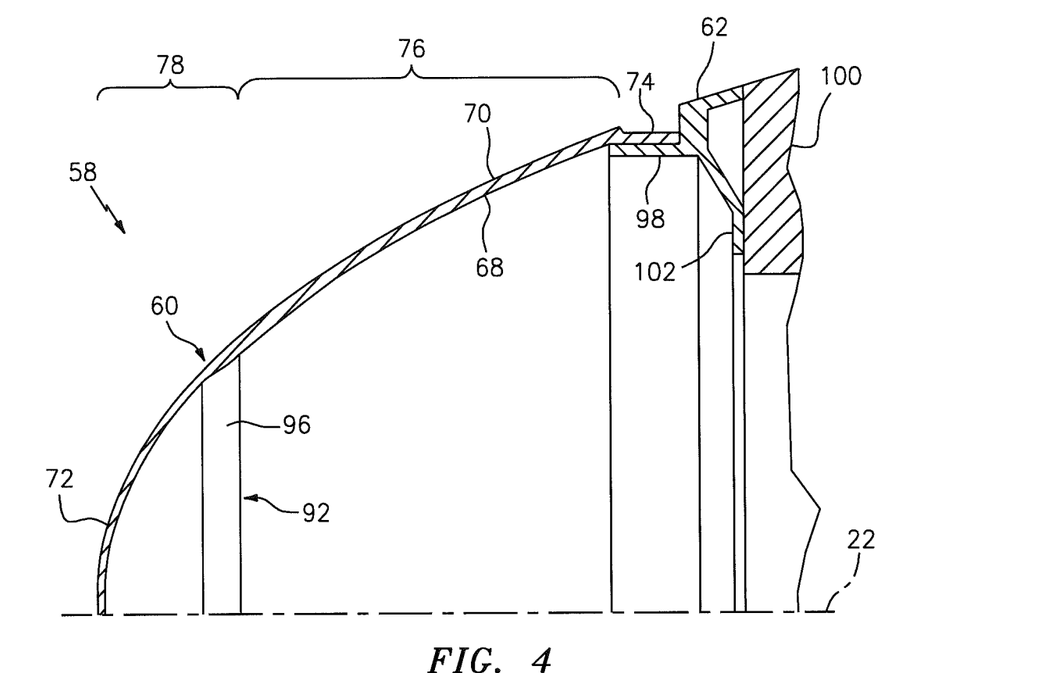
FIG. 4 is a partial side sectional illustration of another nosecone assembly connected to a turbine engine component.

Referring to FIG. 2, the deformation region 78 includes at least one stress concentrator 92. The stress concentrator 92 is adapted to increase material stress at and, thus, selectively weaken the material in at least one area of the sidewall 72. The stress concentrator 92 is arranged within the deformation region 78 to tailor how the material of the sidewall 72 deforms upon being impacted by the object 90. Referring to FIG. 3, for example, the stress concentrator 92 is arranged such the sidewall 72 within the deformation region 78 crumples inwards in an axial downstream direction. Referring again to FIG. 2, the stress concentrator 92 includes a geometric transition between the first region 76 and the second region 78. This geometric transition is configured as a substantially perpendicular step 94 in the interior surface 68 between the first region 76 and the second region 78. Alternatively, the geometric transition may be configured a gradual taper 96 of the interior surface 68 between the first region 76 and the second region 78 as illustrated in FIG. 4. The stress concentrator 92, of course, may have various other configurations and/or arrangements as described below in further detail or that would be readily apparent to those of skill in the art based on the teachings provided herein.

Figure 5:
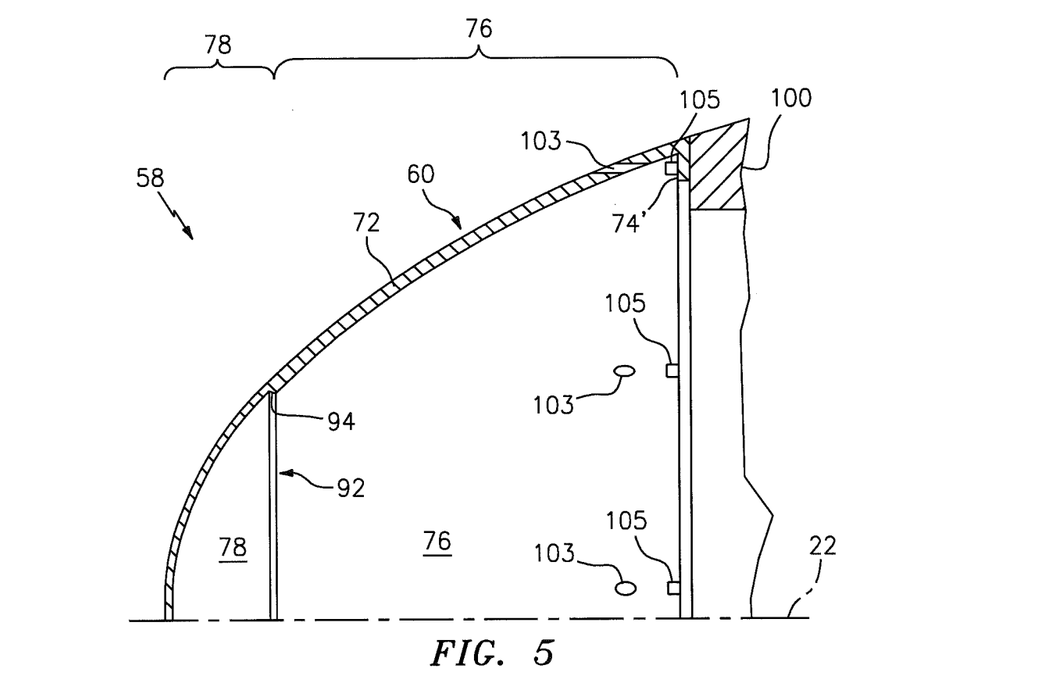
FIG. 5 is a partial side sectional illustration of another nosecone assembly connected to a turbine engine component.

Referring again to FIG. 2, the mounting flange 74 extends circumferentially around the axis 22. The mounting flange 74 extends axially from the sidewall 72 and the base region 76 to the downstream end 66. Alternatively or in addition, the mounting flange 74' may extend radially inwards from the sidewall 72 as illustrated in FIG. 5.

Referring to FIG. 2, the mounting flange 74 is fastened to an upstream flange 98 of the nosecone mount 62 with one or more fasteners (not shown). Alternatively, the mounting flange 74 may be bonded (e.g., welded, brazed and/or otherwise adhered) to the upstream flange 98. The nosecone mount 62 is arranged axially between the nosecone 60 and a turbine engine component 100. The turbine engine component 100 may be a hub of a rotor (e.g., the fan rotor 40) where the nosecone 60 is a spinner. Alternatively, the turbine engine component 100 may be a stator that, for example, is connected to a turbine engine case with a strut. A downstream flange 102 of the nosecone mount 62 is fastened to the turbine engine component 100 with one or more fasteners (not shown). Alternatively, the downstream flange 102 may be bonded to the turbine engine component 100. The nosecone mount 62 therefore connects the downstream end 66 of the nosecone 60 to the turbine engine component 100. Alternative, the nosecone 60 may be connected directly to the turbine engine component 100 as illustrated in FIG. 5. In such an embodiment, the nosecone 60 may include one or more apertures 103. The apertures 103 are adapted to receive a tool (not shown) that mates one or more respective fasteners 105 with the mounting flange 74' and the turbine engine component 100. The present invention, of course, is not limited to any particular connection technique between the nosecone 60 and the turbine engine component 100.

FIG. 6 illustrates the nosecone assembly 58 with another nosecone 104. In contrast to the nosecone 60 of FIG. 2, the nosecone 104 includes an alternate embodiment stress concentrator 106 located adjacent the base region 76. This stress concentrator 106 includes an annular flange 108 that extends radially inwards from the sidewall 72. In addition to tailoring how the material of the sidewall 72 deforms upon being impacted by an object as described above, the flange 108 may also reduce or substantially prevent propagation of a crack into the base region 76 from the deformation region 78 after the impact event.

Figure 7:
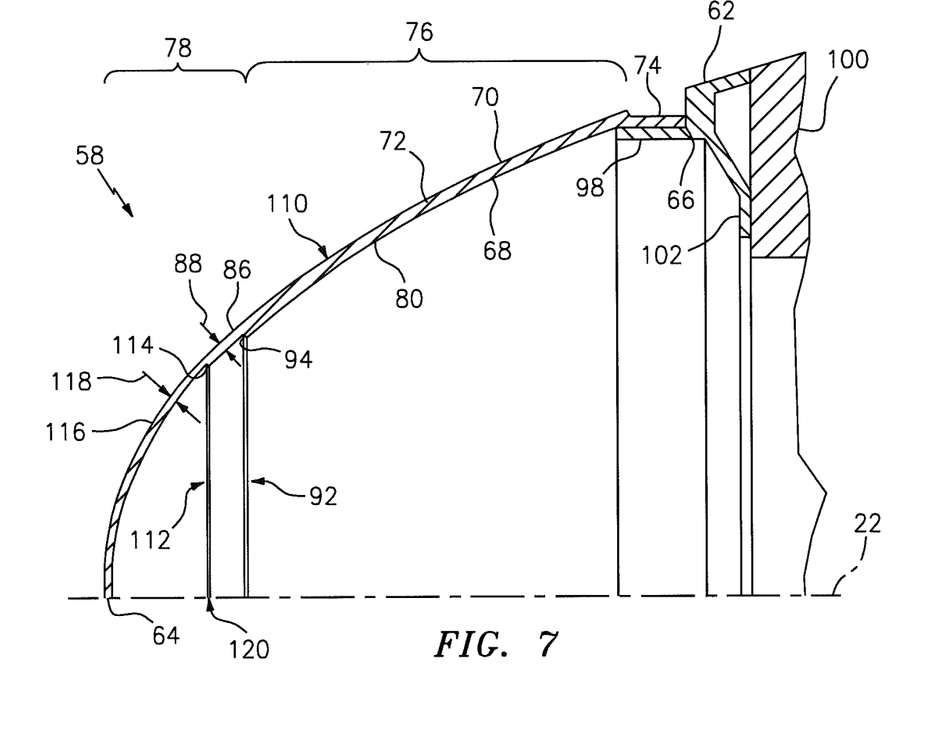
FIG. 7 is a partial side sectional illustration of another nosecone assembly connected to a turbine engine component.

FIG. 7 illustrates the nosecone assembly 58 with another nosecone 110. In contrast to the nosecone 60 of FIG. 2, the deformation region 78 of the nosecone 110 includes an additional stress concentrator 112. The additional stress concentrator 112 includes a geometric transition (e.g., a substantially perpendicular step 114) in the interior surface 68 between the second portion 86 and a third portion 116 of the sidewall 72 within the deformation region 78. The third portion 116 has a third thickness 118 that may be measured at an intersection 120 between the second portion 86 and the third portion 116. This third thickness 118 is less than the second thickness 88. The stress concentrators 92 and 112 therefore form a plurality of steps in the interior surface 68.

FIG. 8 illustrates another nosecone 122 for the nosecone assembly 58 of FIG. 2. In contrast to the nosecone 60 of FIG. 2, the nosecone 122 includes one or more alternate embodiment stress concentrators 124 and 126. The first stress concentrator 124 is located adjacent the base region 76. The first stress concentrator 124 includes a groove 128 that extends circumferentially within the sidewall 72 at least partially (e.g., completely) around the axis. One or more of the second stress concentrators 126 are arranged in a radial array. For example, one or more of the second stress concentrators 126 each includes a groove 130 that extends axially within the sidewall 72 between, for example, the groove 128 and a point of convergence at the tip end 64. In this arrangement, the sidewall 72 within the deformation region 78 may fracture upon collision with an object into one or more segments 132. One or more of these segments 132 may pivot about the groove 128 into an interior cavity 134 of the nosecone 122. Alternatively or additionally, one or more of the segments 132 may break away from the nosecone 122 and travel axially into the interior cavity 134. In this manner, the grooves 128 and 130 are configured to reduce or substantially prevent material from the nosecone 122 from entering a gas path (e.g., the gas paths 54 and/or 56) of the engine during an impact event. One or more of the grooves 128 and 130, of course, may be arranged in various configurations other than that illustrated in FIG. 8. The grooves 136 illustrated in FIG. 9, for example, may each extend circumferentially within the sidewall 72 at least partially (e.g., completely) around the axis 22.

Figure 10:
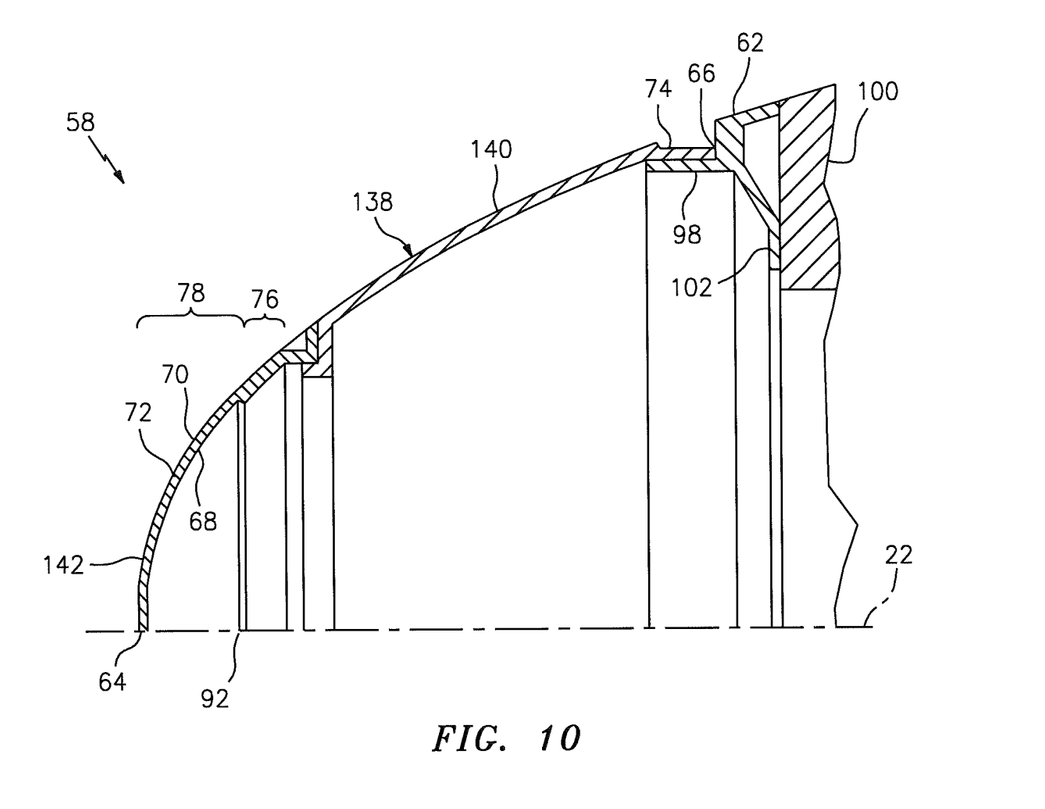
FIG. 10 is a partial side sectional illustration of another nosecone assembly connected to a turbine engine component.

FIG. 10 illustrates the nosecone assembly 58 with another nosecone 138. In contrast to the nosecone 60 of FIG. 2, the nosecone 138 includes a nosecone segment 140 and a discrete cap segment 142. The nosecone segment 140 is arranged and fastened axially between the cap segment 142 and the nosecone mount 74. The cap segment 142 includes the base region 76 and the deformation region 78. With this configuration, the cap segment 142 may be replaced after an impact event without replacing the entire nosecone 138.

One or more components of the nosecone assembly may have various configurations other than those described above and illustrated in the drawings. For example, the nosecone may have a conical geometry rather than the parti-ellipsoidal geometry illustrated in the drawings. The mounting flange may extend radially inwards from a point on the sidewall located an axial distance away from the downstream end. The nosecone may be directly connected to a turbine engine strut. The nosecone mount may be configured as an L-shaped bracket, etc. The nosecone assembly may include various additional components such as a deicing device, sensor electronics, etc., which may be housed within and/or connected to the nosecone. The present invention therefore is not limited to any particular nosecone assembly component types or configurations.

The terms "upstream", "downstream", "inner" and "outer" are used to orientate the components of the nosecone assembly described above relative to the turbine engine and its axis. A person of skill in the art will recognize, however, one or more of these components may be utilized in other orientations than those described above. The present invention therefore is not limited to any particular nosecone assembly spatial orientations.

A person of skill in the art will recognize the nosecone assembly may be included in various turbine engines other than the one described above. The nosecone assembly, for example, may be included in a geared turbine engine where a gear train connects one or more shafts to one or more rotors in a fan section and/or a compressor section. Alternatively, the nosecone assembly may be included in a turbine engine configured without a gear train. The nosecone assembly may be included in a geared or non-geared turbine engine configured with a single spool, with two spools (e.g., see FIG. 1), or with more than two spools. The nosecone assembly may also be included in a propfan engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
a nosecone extending along an axis between a tip end and a second end;
the nosecone comprising a base region and a deformation region configured integral and monolithically with the base region;
the base region arranged axially between the deformation region and the second end; and
the deformation region adapted to deform relative to the base region upon impact of an object, and comprising a stress concentrator.

2. The assembly of claim 1, wherein the deformation region is adapted to deform by at least one of crumpling and fracturing upon impact of the object.

3. The assembly of claim 1, wherein
the nosecone comprises a sidewall;
at least a first portion of the sidewall has a first thickness;
at least a second portion of the sidewall has a second thickness that is less than the first thickness; and
the stress concentrator comprises a transition between the first portion and the second portion.

4. The assembly of claim 3, wherein
the first portion is located within the base region; and
the second portion is located within the deformation region.

5. The assembly of claim 3, wherein the first portion and the second portion are located within the deformation region.

6. The assembly of claim 3, wherein the transition tapers from the first portion to the second portion.

7. The assembly of claim 3, wherein the transition comprises a step between the first portion and the second portion.

8. The assembly of claim 1, wherein
the nosecone comprises a sidewall; and
the stress concentrator comprises a flange that extends radially inwards from the sidewall and is arranged adjacent the base region.

9. An assembly for a turbine engine, comprising:
a nosecone extending along an axis between a tip end and a second end;
the nosecone comprising a base region and a deformation region configured integral with the base region;
the base region arranged axially between the deformation region and the second end; and
the deformation region adapted to deform relative to the base region upon impact of an object, and comprising a stress concentrator;
wherein the nosecone comprises a sidewall; and
wherein the stress concentrator comprises a groove that extends circumferentially within the sidewall at least partially around the axis.

10. An assembly for a turbine engine, comprising:
a nosecone extending along an axis between a tip end and a second end;
the nosecone comprising a base region and a deformation region configured integral with the base region;
the base region arranged axially between the deformation region and the second end; and
the deformation region adapted to deform relative to the base region upon impact of an object, and comprising a stress concentrator;
wherein the nosecone comprises a sidewall; and
wherein the stress concentrator comprises a groove that extends axially within the sidewall.

11. The assembly of claim 1, wherein
the stress concentrator is one of a plurality of stress concentrators included in the deformation region; and
at least some of the plurality of stress concentrators are arranged in a radial array.

12. The assembly of claim 1, wherein
the nosecone comprises a sidewall;
the stress concentrator is one of a plurality of stress concentrators included in the deformation region; and
at least some of the plurality of stress concentrators each extend circumferentially within the sidewall at least partially around the axis.

13. The assembly of claim 1, wherein the nosecone comprises:
a sidewall; and
a mounting flange connected to the sidewall and located at the second end.

14. The assembly of claim 1, further comprising an annular nosecone mount fastened to the nosecone at the second end.

15. The assembly of claim 1, wherein
the nosecone comprises a nosecone segment and a cap segment fastened to the nosecone segment; and
the cap segment comprises the base region and the deformation region.

16. The assembly of claim 1, further comprising:
a plurality of engine rotors arranged along the axis and including a first rotor and a second rotor, each of the engine rotors comprising a plurality of rotor blades arranged around and connected to a rotor disk;
wherein the first rotor is driven by the second rotor; and
wherein the nosecone is connected to the first rotor.

17. The assembly of claim 16, further comprising a gear train that connects the first rotor and the second rotor together.

18. The assembly of claim 1, further comprising:
a stator;
wherein the nosecone is connected to the stator.

19. An assembly for a turbine engine, comprising:
a nosecone extending along an axis between a tip end and a second end;
the nosecone comprising a base region and a deformation region configured integral and monolithically with the base region;
the base region arranged axially between the deformation region and the second end; and
the nosecone further comprising means for deforming the deformation region relative to the base region upon impact of an object.

20. An assembly for a turbine engine, comprising:
a nosecone extending along an axis between a tip end and a second end;
the nosecone comprising a sidewall, a base region and a deformation region configured integral with the base region;
the base region arranged axially between the deformation region and the second end; and
the deformation region comprising a plurality of stress concentrators;
wherein a first of the stress concentrators comprises a groove that extends at least one of circumferentially within the sidewall at least partially around the axis; and axially within the sidewall.

* * * * *